UNITED STATES PATENT OFFICE.

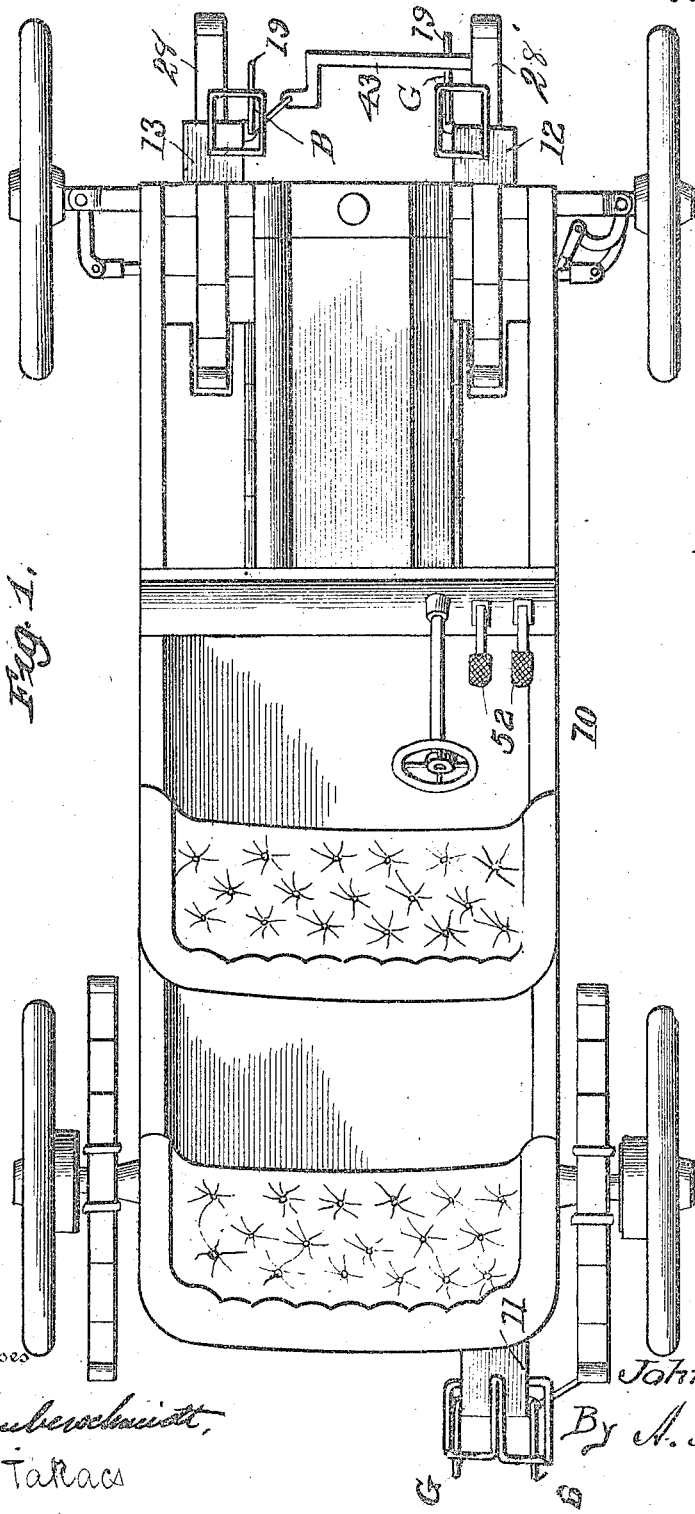

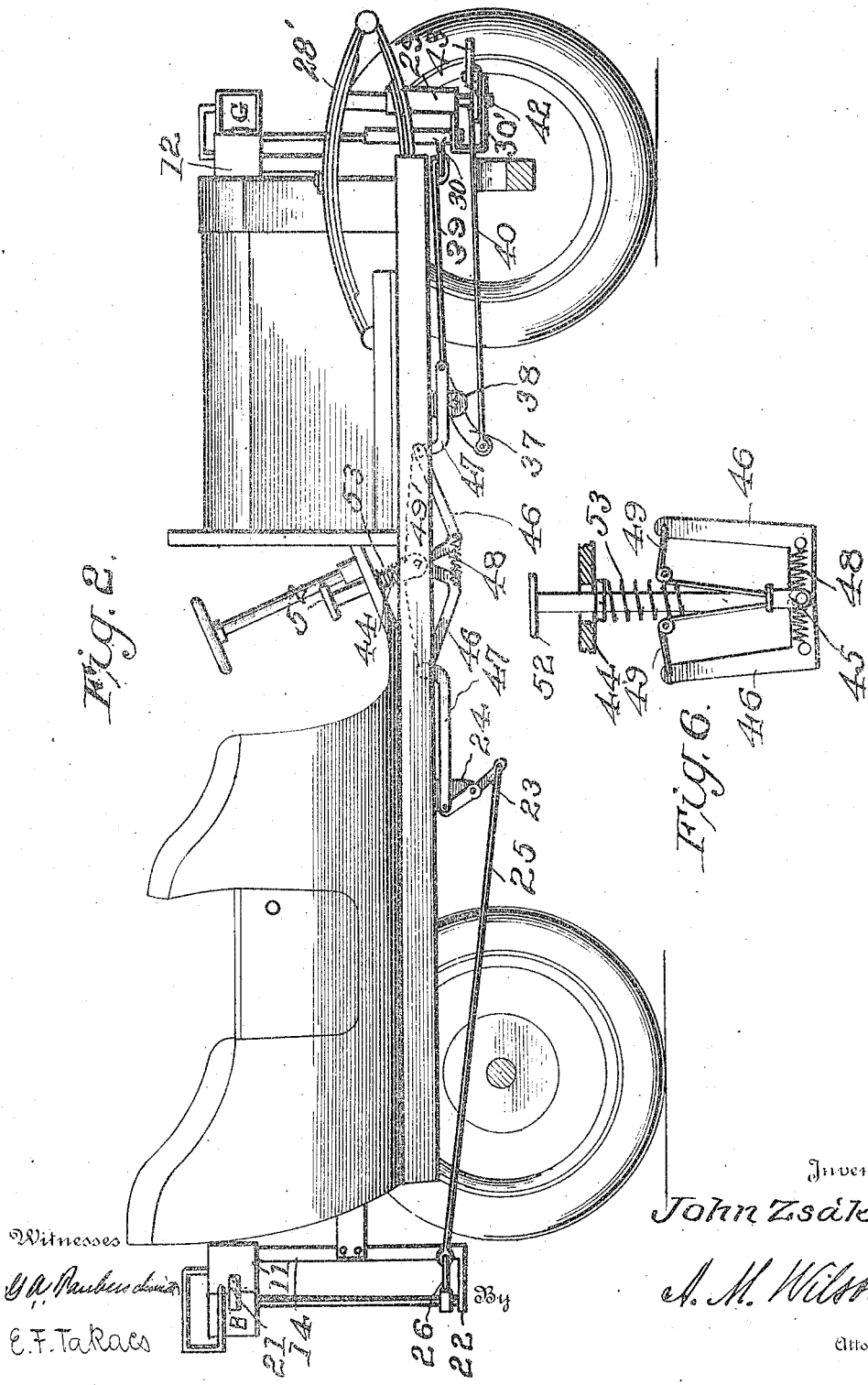

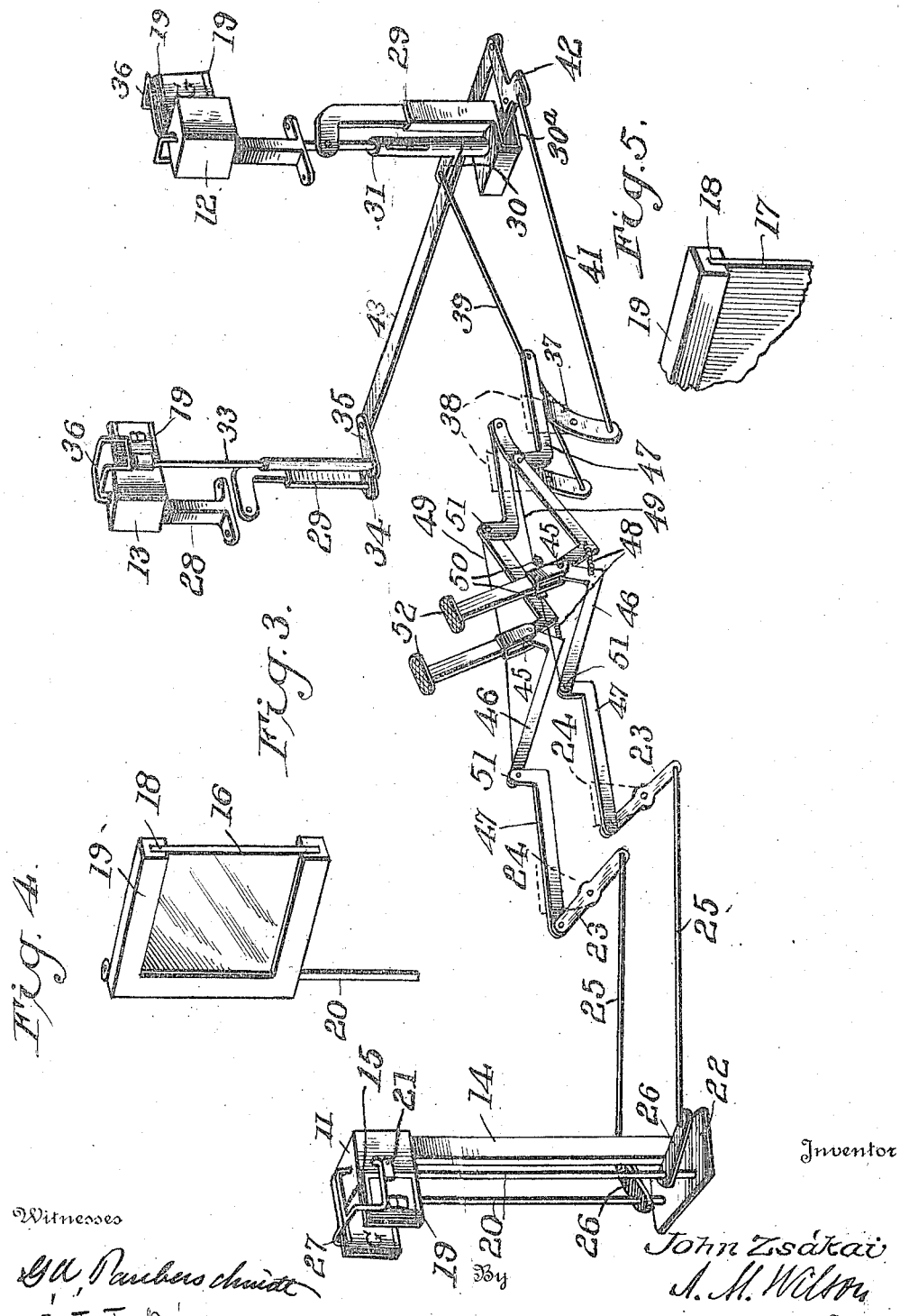

JOHN ZSÁKAI, OF ST. LOUIS, MISSOURI.

AUTOMOBILE DIRECTION-SIGNAL.

1,145,537.   Specification of Letters Patent.   Patented July 6, 1915.

Application filed April 10, 1914.  Serial No. 830,977.

*To all whom it may concern:*

Be it known that I, JOHN ZSÁKAI, a subject of the King of Hungary, residing at St. Louis, in the State of Missouri, have invented certain new and useful Improvements in Automobile Direction-Signals, of which the following is a specification.

This invention relates to new and useful improvements in automobile direction signals.

The primary object of the invention is to provide a signal both at the front and the rear of a vehicle and operable by the foot of the driver, whereby the future intended direction of travel is visually indicated for advising pedestrians and the drivers of other vehicles.

A further object is the provision upon a vehicle of a color signal discernible both by night and by day for visually indicating to an observer the direction in which the vehicle is about to turn.

A still further object is to provide color flags for day use and color glasses employable in the night time and located at both ends of the automobile and shiftable to operative position by means of foot levers controlled by the driver and automatically returned to their normal inoperative positions.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a plan view of an automobile illustrating the present signals installed thereon. Fig. 2 is a side elevation thereof. Fig. 3 is a perspective view of the entire signal system and operating mechanism detached. Fig. 4 is a perspective view of a shiftable signal frame having a colored glass positioned therein. Fig. 5 is a detail view of a portion of said frame with a tin signal member therein, and Fig. 6 is a detail view in side elevation of a portion of one of the foot lever actuating means in its signal operated position.

The present system of safety direction signals for vehicles is illustrated installed upon the automobile 10 and it is to be understood that the signals operable as hereinafter described are used in connection with a single tail lamp 11 and right and left side lamps 12 and 13 respectively and while lamps of a special design are herein illustrated, the signal system may be readily installed in connection with any of the usual forms of vehicle lamps. The tail lamp 11 is shown mounted at the rear of the automobile upon a bracket 14 and is provided with the usual red front glass 15.

The viewable signals consist of the employment of colored glass plates 16 in the night time and colored tin signs 17 in the day time, each being formed of a size to be readily slid within the grooves 18 of frame members 19, these frames being rigidly secured for turning upon revoluble posts 20. Two frames 19 are employed for the tail lamp and having their full length posts 20 revolubly journaled at the opposite rear corners of said lamp upon brackets 21 and being also journaled in a supporting plate 22 mounted upon the bottom of the bracket 14.

Two centrally pivoted levers 23 are mounted for movement upon brackets 24 upon the under side of the automobile frame and the lower arms of said levers are connected by rods 25 with projecting arms 26 secured to the posts 20 and whereby as will be evident, a swinging of either of the levers 23 upon its pivot results in rotating its respective post 20 and the frame 19 carried thereby. A guard frame 27 downwardly projecting on either side of the tail lamp limits the outward swinging movement of the frames and whereby it will be seen that either frame may assume its normal rearwardly projecting position as illustrated in each view of the drawings while upon a rotation of its carrying post 20 the desired one of said frames will swing inwardly and thereby exposing to rearward view its carried tin sign or glass plate, whichever is carried in the frame.

In connection with the viewable direction signals the establishing of certain colors as denoting definite directions is essential in that such a color as blue herein employed denotes a turning to the left, while the color green either disclosed by the sign or transparent plate indicates an intended route toward the right.

The forward side lamps are preferably mounted on brackets 28 which are seated upon the springs 28' of the vehicle and the operating mechanism is supported through the medium of telescoping spring arms 29 attached to the springs.

One of the spring arms 29, that adjacent the right of the automobile, is connected to a bracket 30 whereon is revolubly-mounted a telescoping post 31 extending up alongside of the respective member 28 and carrying at its upper end a frame 19 which normally projects in a forward direction as shown in Fig. 3, the frame 19 being the same as the frame 19 previously described and similarly being provided with a signal pane 16. A similar post 33 is revolubly mounted upon the bottom bracket 34 of the left hand spring arm 29 and is likewise provided with a carrying frame 19 adjacent the inner vertical edge of the left hand lamp 13 and whereby a partial revolution of the post 33 by means of the arm 35 extending therefrom, the signal tin or plate within the frame may be moved from its normal forwardly projecting position to a point in front of the lamp and whereby the rays of the lamp may be projected through the colored glass plate carried by the frame at night while the tin sign will be viewable from in front of the automobile in the day time. Wire brackets 36 are carried by the lamps 12 and 13 for limiting the outward swinging movement of the pivoted carrying frame. While the rear lamp 11 is provided with both a green and blue sign, either of which may be positioned at will for viewing the same from the rear of the vehicle and thereby determining whether its line of travel will be toward the right or the left, the side lamps are only provided with one sign apiece, the right hand lamp post 20 carrying the green glass or plate and the left hand lamp the blue glass or plate. Two curved pivoted levers 37 are mounted upon brackets 38 beneath the automobile body and are operatively connected to the respective revoluble posts 31 and 33 of the right and left hand lamps. The left hand one of the curved levers 37 is connected by a rod 39 to the projecting arm 30 of the post 31 and whereby said post is rotatively moved upon a shifting of said lever while a corresponding movement is imparted to the signal carrying frame 19 of said post 31. The other and outwardly positioned curved lever 37 is connected by a rod 41 to a bell-crank lever 42 pivoted to the bracket 30ª while said lever 42 is connected by the bar 43 with the arm 35 of the revoluble rod 33. By this arrangement a movement of such outer curved lever 37 is adapted for turning said post 33 and its signal frame 19 in connection with the left hand lamp 13.

Normally upwardly projected foot levers or pedals 52 are carried by the floor 44 of the automobile and have their bottom ends pivoted as at 45 to the upwardly projecting ends of oppositely extending angular levers 46, the outer ends of which angular levers are connected by means of angular arms 47 to the upper free ends of the levers 23 and curved levers 37 between which they are respectively arranged. The angle portions of the angular levers 46 are resiliently connected together by means of springs or other similar devices 48. Cords 49 are adapted for running over pulleys or wheel members 50 illustrated in dotted lines in Fig. 3 while the opposite ends of said cords are connected respectively with the pivots 45 and the opposite pivoted ends 51 of the angular levers 46.

All of the signal carrying frames 19 are normally positioned projecting longitudinally of the vehicle as illustrated in Fig. 1, and when the driver of the automobile is about to turn toward the right and desires to display both a front and rear green signal, he depresses the left foot lever or pedal 52. Should it be intended to turn the vehicle toward the left, the driver will depress the outer or right foot lever 52 and thereby actuate for display a blue front and rear signal. Such signals in the day time consist of the tin sign 17 positioned within the frame 19 and readily discernible by reason of the coloring thereof, while in the night time the tin signs are removed and the colored glass plates 16 substituted therefor, which upon being turned in front of the lamps are clearly discernible. The depressing of a foot lever 52 lowers the angular levers 46 pulling downwardly the arms 47 and thereby moving both the pivoted lever 23 and the curved lever 37 connected therebetween and thus revolving the respective front and rear posts connected to such arm and lever. The cords 49 as will be evident by reason of their running over the pulleys 50 having fixed bearings, pull the opposite outer ends of the angular levers 46 inwardly and upwardly as the inward pivot 45 thereof is moved downwardly. The signal frames being thus actuated, the same automatically return to their normal positions by means of the foot lever springs 53 moving said levers upwardly and the resilient members 48 drawing the angular levers 46 toward each other. The return movement of the connecting members to the normal inoperative position shown in Fig. 3 is from the projected positions thereof, parts of which connecting members are illustrated in Fig. 6. While the side lamps and forward brackets 30 and 34 may be secured to any desired portion of the automobile, the same are herein shown suspended the upper leaves of the forward springs and by reason of the action of said springs, the brackets are mounted upon the form of spring arms 29 which are telescoping members allowing for such spring action, while the front signal posts 31 and 33 are also formed of telescoping members, the separate members of which however are revoluble as a unitary post.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What is claimed as new is:—

1. In combination with an automobile, a tail lamp and a side lamp positioned thereon, revoluble posts journaled adjacent to the front portions of said lamps, signal plates of the same color secured to said posts adjacent to said lamps, projecting arms upon said posts, levers pivoted to the automobile, connecting rods between said levers and arms, a foot pedal, link connections pivotally connecting the bottom of said pedal to said levers, and resilient automatic returning means carried by said pedal and levers.

2. A direction signal for automobiles comprising a normally projected foot pedal rod, angular levers having their short arms pivoted together and to the lower end of said pedal, resilient means secured between the angle portions of said levers, angular connectors pivoted to the opposite outer ends of said levers, roller members upon the automobile, pliable connectors positioned over said roller members and having their inner ends connected to the pivot connecting the pedal and angular levers and their outward ends secured to the outer pivoted ends of said angular levers, levers pivoted to the front and rear of automobile and having the upper arms thereof pivoted to the outer ends of said connectors, a tail and a side lamp upon said automobile, revoluble posts positioned adjacent to said lamps, operating means between said posts and the lower ends of said levers, similarly colored signal plates carried by each of said posts adjacent to said lamps.

3. In a direction signal for automobiles, a signaling mechanism including rotatable elements, and means to rotate said elements comprising a normally projected pedal rod, angular levers each having an arm pivoted to said rod, resilient means secured between the angle portions of the levers, links connected to the remaining ends of said levers, rock levers connected to said links, and an operative connection between said rock levers and rotatable elements.

4. In a direction signal for automobiles, a signaling mechanism including rotatable elements, and means to rotate said elements comprising a normally projected pedal rod, angular levers each having an arm pivoted to said rod, resilient means secured between the angle portions of the levers, links connected to the remaining ends of said levers, rock levers connected to said links, rock arms fixed on said rotatable elements, and links connecting said rock arms and rock levers.

In testimony whereof I affix my signature in presence of two witnesses.

JOHN ZSÁKAI.

Witnesses:
 JOHN JUNG,
 KOSTOS RUSTIG.